United States Patent [19]

Wartusch et al.

[11] Patent Number: 4,897,312

[45] Date of Patent: Jan. 30, 1990

[54] POLYMER-BASED ELECTRICAL INSULATION AND ELECTRICAL CONDUCTOR INSULATED THEREWITH

[75] Inventors: Johann Wartusch, Vellmar; Werner Gölz, Mainz; Holger Andress, Riedstadt, all of Fed. Rep. of Germany

[73] Assignee: Licentia Patent-Verwaltungs-GmbH, Frankfurt, Fed. Rep. of Germany

[21] Appl. No.: 148,628

[22] Filed: Jan. 26, 1988

[30] Foreign Application Priority Data

Jan. 26, 1987 [DE] Fed. Rep. of Germany ....... 3702209
Oct. 8, 1987 [EP] European Pat. Off. ........ 87114730.2

[51] Int. Cl.$^4$ .............................................. B32B 9/06
[52] U.S. Cl. ................................... 428/450; 524/188; 524/251; 524/262; 524/265; 524/267; 524/327; 524/382; 524/398; 428/447
[58] Field of Search .............. 524/262, 265, 267, 188, 524/251, 327, 382, 398; 428/447, 450

[56] References Cited

U.S. PATENT DOCUMENTS

| | | | |
|---|---|---|---|
| 4,299,713 | 11/1981 | Maringer | 134/110 SR |
| 4,347,288 | 8/1982 | Minnema et al. | 428/389 |
| 4,400,429 | 8/1983 | Barlow et al. | 174/110 |
| 4,450,266 | 5/1984 | Idel et al. | 524/265 |
| 4,514,537 | 4/1985 | Cavanaugh | 524/265 |
| 4,535,106 | 8/1985 | Abolins et al. | 524/267 |
| 4,549,041 | 10/1985 | Shingo et al. | 428/391 |
| 4,650,826 | 3/1987 | Waniczek et al. | 524/262 |

FOREIGN PATENT DOCUMENTS

| | | |
|---|---|---|
| 0107211 | 9/1981 | European Pat. Off. . |
| 0114495 | 12/1983 | European Pat. Off. . |
| 0259653 | 8/1987 | European Pat. Off. . |
| 2737430 | 2/1979 | Fed. Rep. of Germany . |

*Primary Examiner*—Melvyn I. Marquis
*Attorney, Agent, or Firm*—Spencer & Frank

[57] ABSTRACT

Insulated electrical conductor and electrical insulation which includes a polyolefin as polymeric base material and a voltage stabilizer included in the polyolefin and comprised of at least one hydrolyzable alkoxy compound, which at least one hydrolyzable alkoxy compound is a liquid at a temperature ranging from about $-25°$ C. to about $140°$ C. and has a formula:

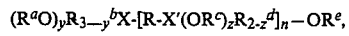

$$(R^aO)_y R_{3-y}^b X\text{-}[R\text{-}X'(OR^c)_z R_{2-z}^d]_n\text{-}OR^e,$$

where $R^a$, $R^c$ and $R^e$ are hydrocarbon groups having 1 to 18 carbon atoms; $R^b$ and $R^d$ are saturated or unsaturated, substituted or unsubstituted aliphatic hydrocarbon groups or aromatic hydrocarbon groups having from 1 to 30 carbon atoms; R is a group having a carbon skeleton including at least one heteroatom Y; O is oxygen; X and X' are elements having a valence of four; n varies from 1 to 10, y varies form 0 to 3, z varies from 0 to 2, and where R, $R^a$, $R^b$, $R^c$ and $R_d$ appear independent from one another in a specific composition.

22 Claims, No Drawings

POLYMER-BASED ELECTRICAL INSULATION AND ELECTRICAL CONDUCTOR INSULATED THEREWITH

CROSS-REFERENCE TO RELATED APPLICATIONS

This application claims the priority of Federal Republic of Germany Patent Application No. P 37 02 209.1 filed Jan. 26, 1987, and European Patent Application No. 87 114 730.2 filed Oct. 8, 1987, which are incorporated herein by reference.

BACKGROUND OF THE INVENTION

1. Field of the Invention

The present invention relates to polymer-based electrical insulation for insulating electrical conductors, such as wires and cables, especially high voltage cables, and in particular to electrical insulation composed of a polyolefin as polymeric base material and a voltage stabilizer included in the polyolefin to inhibit tree formation in the electrical insulation when the electrical insulation is exposed to high voltage.

2. Description of the Related Art

Polymer-based electrical insulation used to insulate high voltage cables may, under voltage stresses, form microscopically visible, tree-like or bunch-like destruction zones in the insulation, which destructive phenomena is called "treeing." Of great significance is the formation of even more undesirable "water trees", i.e., concentrations of water which form at tree-like or bunch-like destruction zones in the insulation under high field intensities. Treeing is objectionable because it presents an electrical breakdown hazard and reduces the service life of electrical cable provided with such polymer-based electrical insulation.

German Patent No. 2,737,430 discloses the addition of voltage stabilizers composed of alkoxysilanes to a polyolefin-based electrical insulation composition. Addition of alkoxysilanes is said to prevent water tree formation, e.g., in polyolefins crosslinked in hot steam. Alkoxysilanes are disclosed which have the general formula $R_x$—Si(O—R')$_{4-x}$, where R, R' are aliphatic, aromatic or cycloaliphatic hydrocarbon group, optionally also substituted by amino groups, epoxy groups or other groups, and where x=0 to 3. Preferably, (O—R') is an alkoxy group; especially a methoxy group.

These prior art voltage stabilizers, however, do not always exhibit sufficient miscibility with the polymeric base material so that manufacture of the electrical insulation is made more difficult. If the voltage stabilizing additives are not homogeneously dispersed in the mixture, their efficiency as voltage stabilizers is greatly limited and, if exposure to high voltage during use results in treeing damage, migration paths to water trees become unacceptably large on the average.

Some otherwise efficient stabilizers have the additional drawback that they make the polyolefin melt, for example, an XLPE (cross-lined polyethylene) melt, non-transparent which makes it impossible to monitor the cleanliness and homogeneity of the insulation, as required by a recent VDE [Verband Deutscher Elektrotechniker (Association of German Electrical Engineers)] rule.

SUMMARY OF THE INVENTION

It is an object of the present invention to provide a polymer-based electrical insulation in which effective stabilizer additives can be homogeneously mixed into the polymeric base material while retaining good transparency of the melt so that the cleanliness and homogeneity of the insulation can be monitored and so that tree formation and propagation are inhibited.

It is a further object of the invention to provide an electrical conductor which is enclosed by the inventive polymer-based electrical insulation and which therefore enjoys an extended service life and reduced electrical breakdown hazard.

These and other objects according to the invention are accomplished by providing an insulated electrical conductor including at least one conductor enclosed by electrical insulation, which electrical insulation includes a polyolefin as polymeric base material and a voltage stabilizer included in the polyolefin and comprised of at least one hydrolyzable alkoxy compound, which at least one hydrolyzable alkoxy compound is a liquid at a temperature ranging from about −25° C., to about 140° C., is, preferably, present at least in an amount effective to inhibit tree formation in the electrical insulation, and has a formula:

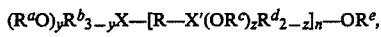

where $R^a$, $R^c$ and $R^e$ are hydrolizable hydrocarbon groups having 1 to 18 carbon atoms; $R^b$ and $R^d$ are saturated or unsaturated, aliphatic hydrocarbon groups or aromatic hydrocarbon groups having from 1 to 30 carbon atoms and having hydrogen and functional groups; R is a group having a carbon skeleton and at least one heteroatom Y, preferably, R is a group having from 1 to 20 carbons and having at least one heteroatom Y included therein; O is oxygen; X and X' are elements having a valence of four, for example, Si and Ti; n varies from 1 to 10, y varies from 0 to 3, z varies from 0 to 2, and where R, $R^a$, $R^b$, $R^c$ and $R^d$ appear independent from one another in a specific composition.

In the foregoing formula, —R— may have the form —R'—Y'—R"—, where Y' is a group having at least one heteratom Y; R' and R" are aliphatic or aromatic groups which have from 2 to 40 carbon atoms the valences of which are saturated by at least one of hydrogen and functional groups, and which have identical compositions or different compositions. Alternately, —R— may have the form

where R* is an aliphatic hydrocarbon group or an aromatic hydrocarbon group; and where Y* is a group having at least one heteratom Y.

Such polymer-based electrical insulation not only exhibits good long-term stability, but the voltage stabilizers according to the invention can also be easily mixed into the polymeric base material. Further, if a cross-linked polymeric base material is employed, cross-linking is not interfered with by the addition of the stabilizer. Moreover, the voltage stabilizers are liquids at a temperature ranging from about −25° C. to about 140° C. and, thus, the avoidance of recrystallizable substances in the XLPE not only ensures sufficient protection against the development and growth of water trees, it also prevents the development of "electrical trees" so that increased safety from electrical breakdowns is realized. Moreover, with a suitable composition, for example, a composition having a voltage stabilizer including appropriate functional groups, not only is treeing prevented but also the thermal aging behavior of the polymer-based electrical insulation is favorably influenced.

The voltage stabilizer additives according to the invention do not volatilize noticeably even with increasing service life. In particular, due to the transparency of the XLPE melt, the polymeric insulation provided with the stabilizers according to the invention permits the purity monitoring now required by the VDE.

The absence of hydrophilic groups like OH in the stabilizers according to the invention means that the stabilizers can be mixed very easily into the polymer-base material and, correspondingly, the thus-stabilized XLPE can be processed easily. In any event, the stabilizers after reaction with water have a minimum of polar or hydrophilic behavior which, according to presently known mechanisms, contributes to inhibition of the formation of water trees.

On the other hand, the stabilizers according to the invention are hydrolyzable alkoxy compounds and react with water while releasing hydrophilic substances which is of significance for retarding formation of water trees. Water, present here as a result of the manufacturing process or as a result of diffusion into the insulating material in use in the field, is eliminated in this way by being chemically reacted or by being physically bound. If a water tree should begin to form at a point in the insulation at which stabilizer molecules are present, not only is the growth of water trees inhibited by the hydrolyzable alkoxy compounds, such as by a silane or a titanate which forms analogous compounds like silanes and reacts in a similar way, these alkoxy compounds consume water themselves and are activated. The activated stabilizer then additionally prevents growth of defects.

For making heavy metal impurities electrically ineffective vs. treeing, one can synthesize suitable stabilizers by incorporating heteroatoms into the compounds at suitable locations. The heteroatoms preferably appear in one of numerous groups suitable for complex formation.

DESCRIPTION OF THE PREFERRED EMBODIMENTS

A few examples of preferred stabilizers and their effects will now be listed.

An alkoxysilane useful as a stabilizer according to the invention is, for example, bis(3-trimethoxysilylpropyl)-monosulfide having the following structure:

$(CH_3O)_3Si-CH_2CH_2CH_2-S-CH_2CH_2CH_2-Si(OCH_3)_3$.

Ethoxy groups $C_2H_5O$ may take the place of the methoxy groups $CH_3O$ with the advantage of further reduced volatility. In the exemplary alkoxysilane selected here and with reference to the general formula given in the Summary of the Invention, $Y=S$ and $n=1$. If $n=2$, the volatility of the compound advantageously becomes even less.

Under the influence of water, this exemplary alkoxysilane forms a low alcohol and a silanol compound. The OH groups are significantly effective as a water tree stabilizer, that is, for inhibiting water tree formation and/or growth. Moreover, the thioether bridge in the molecule may gain significance should transition metal impurities enter into the insulation, such as by diffusion. The thioether bridge functions as a ligand to complex with the transition metal impurity which makes the impurity electrically ineffective and reduces the electrical breakdown hazard.

The effectiveness of the above-mentioned alkoxysilane stabilizer having methoxy groups on a cross-linked polyethylene electrical insulation base material having a gel content of 83% was demonstrated in a test with a non-homogeneous electrical field arrangement known in the art as the needle test.

For a number of reasons the test method adopted was based upon using needle-tip depressions as artificial defects.

The electrode arrangements is a of needle-plane type with a reservoir of water in contact with the needle-tip depressions. This produces a high field gradient around the electrode tip. For the preparation of defects 8 commercially available treeing-needles (tip radius: 3 μm; included angle at tip: 30°) are depressed 0.5 mm into specimens of 2 mm thickness.

The preparation is performed in a water tank (tap water at RT) and the needles are then removed with the sample kept under the water surface (so that water fills the needle-induced cavities automatically).

Freshly produced samples having no stabilizer had water trees having an average length of 100 μm and having a maximum length of 185 μm. Freshly produced samples having 1% by weight of stabilizer had an average length ranging from 50 to 70 μm and had a maximum length ranging from 70 to 170 μm. However, an improvement in the treeing resistance of the XLPE mixture was evident only on annealed samples. Samples were annealed by heat treating to remove peroxide decomposition products remaining in the polymer after crosslinking thereof with a peroxide crosslinking agent. After annealing, the samples having no stabilizer, i.e., corresponding to a product presently on the market, had water trees having an average length of 290 μm and a maximum length of 440 μm, while stabilized samples according to the invention, had water trees having an average length of 55 μm and a maximum length of 100 μm.

Also another XLPE product presently on the market which consisted of a low density polyethylene blend with a copolymer but without addition of silane stabilizer was tested and was found to have relative improved properties. But after annealing, this XLPE product still produced water trees having an average length of 150 μm and a maximum length of 325 μm. Corresponding stabilizer compounds based on titanium according to the invention also exhibit a good stabilizer effect.

Thus, it has been demonstrated that under strict test conditions simulating operational conditions for an electrical cable provided with the inventive polymer-based electrical insulation, the stabilized electrical insulation according to the invention exhibits considerable advantages over prior art polymer-based insulation with respect to the electrical breakdown hazard and in terms of a long service life.

These useful hydrolyzable alkoxy compounds can be modified at least in part by replacing the methyl groups in the above alkoxysilane formula with octyl groups. This increases the compatibility of the stabilizer with the polyolefin. Moreover, multiplication of the center part of the molecule, i.e., increasing n from $n=1$ to n=2, 3, etc., produces an oligomeric compound having a lower diffusion rate which ensures an increased dwell lifetime in the XLPE. Finally, functional groups having carbon-carbon double bonds, for example, vinyl groups, may be advantageously introduced into the $R^b$ and/or $R^d$ groups and cause the stabilizer to bond to the polymeric base material. Additional functional groups introduced into the R′ and/or R″ groups are able to advantageously inhibit electrical treeing of the electrical insulation, as well as oxidative aging of the polymer base thereof. Examples of functional groups retarding electrical treeing are OH and C=O groups, e.g., in the structure —CH$_2$—CO—CH$_2$—CH$_2$ or —CH$_2$—CO—CH$_2$—CO—CH$_2$—. Groups with antioxidative effects are, for example, sterically hindered substituted phenols.

In addition to considerations of chemical compatibility and miscibility with the polymeric base material, the consistency of the voltage stabilizer is also of interest for mixing purposes. Preferably, liquid alkoxysilanes are selected which are, moreover, liquid at a temperature ranging from about −25° C. to about 140° C. Long-term stability is improved if the size of the molecules or, more precisely, the molecular weight thereof is selected so that loss of stabilizer due to diffusion out of the material at elevated temperatures occurs only to a negligible degree. The stabilizers and the relevant hydrolysis products thereof should therefore preferably have boiling points above 140° C.

The liquid state of the claimed alkoxysilane stabilizers and their good solubility and diffusion capability offer good conditions for a manufacturing process based on diffusion/absorption thereof to provide the stabilized, polymer-based electrical insulation. Optionally and advantageously, antioxidants (insofar as they are not bound to the silane) and crosslinking agents may be dissolved in the silane and applied to the polymer granulate under suitable conditions so that they diffuse or are absorbed along with the silane Such a gentle and impurity-free "mixing" process, i.e., method of inclusion, is of great significance for the extreme cleanliness requirements placed a high voltage insulation.

Another possibility for providing silanes having a sufficiently high molecular weight is to introduce into the molecule a secondary amino group as indicated by the following formula instead of the previously mentioned thioether bridge:

(C$_2$H$_5$O)$_3$—Si—CH$_2$CH$_2$CH$_2$—NH—CH$_2$CH$_2$CH$_2$—Si—(OC$_2$H$_5$)$_3$, where, with respect to the general formula given in the Summary Of The Invention, R′ and R″ are unbranched alkane groups each having three carbon atoms; Y′ is a secondary amino group; and n=1, z=2 and y=3. A secondary amino group may also be introduced by an oligomerizing linkage of, for example, a vinyl silane with 2,2,4-trimethyl-3,4-dihydroquinoline.

It is important that the aminosilanes have no free NH$_2$ groups present because these form Schiff bases with ketones from cross-linking agent decomposition products, such as peroxide decomposition products, which make the XLPE nontransparent and which, as solid constituents, provide starting points for "electrical trees" and "bow-tie trees". "Bow-tie trees are defects which are believed to be caused by inhomogeneities in the volume of the insulation.

Preferred Y′ groups are alkyl mercapto, alkyl hydroxy, thiophene, furan and pyrrole.

Functional groups contained in R′ and/or R″ have been found to impede the formation and/or growth of water trees and electrical trees. R′ or R″ may be, for example, a keto group having the following form:

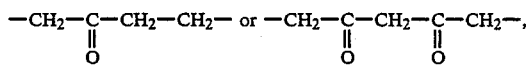

which, by tautomerism, is able to change to the enol form. Particularly by incorporation of a styrene or diethyl benzene group instead of R′ or R″, a system, for example, of aromatic substances capable of resonance is utilized for stabilization. Of course, all previous groups known to have stabilizing activity can be used as functional groups for example, hydroxyl groups.

Mixtures of the individual stabilizers can also be employed. Thus, stabilizers according to the invention are hydrolyzable alkoxy compounds and may be one or more alkoxysilane, one or more alkoxytitanate, and mixtures thereof.

The amount of voltage stabilizer incorporated into the polymer-based electrical insulation should be an amount effective to inhibit tree formation and growth in the electrical insulation Preferably, at least water tree formation in the electrical insulation is inhibited and most preferably, electrical tree formation is inhibited when the electrical insulation is exposed to high voltage. Thus, from 0.01 to 5% by weight of voltage stabilizer may be incorporated into the polymeric base material; preferably from 0.1 to 2% by weight; most preferably from 0.5 to 1.5 by weight.

Polyolefins, such as polyethylene, or ethylene copolymers, whether cross-linked or uncross-linked, or elastomers, can be used as the polymeric base material and all of these are intended to be included within the meaning of "polyolefin" as used herein. Mixtures of these various types of polymeric base materials with one another can also be employed.

The voltage stabilizing additives described herein make available to the electrical engineering art voltage stabilized, polymer-based insulating materials whose electrical breakdown behavior is improved. Of particular economic significance are the invention's polymer-based electrical insulation for high voltage cables.

It will be understood that the above description of the present invention is susceptible to various modifications, changes and adaptations, and the same are intended to be comprehended within the meaning and range of equivalents of the appended claims.

What is claimed is:

1. Electrical insulation comprising:
    a polyolefin as polymeric base material; and
    a voltage stabilizer included in the polyolefin and comprised of at least one hydrolyzable alkoxy compound, which at least one hydrolyzable alkoxy compound is a liquid at a temperature ranging from about −25° C. to about 140° C. and has a formula:

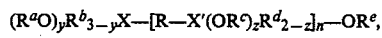

where $R^a$, $R^c$ and $R^e$ are hydrocarbon groups having 1 to 18 carbon atoms; $R^b$ and $R^d$ are saturated or unsaturated, aliphatic hydrocarbon groups or aromatic hydrocarbon groups having from 1 to 30 carbon atoms and having hydrogen and functional groups; R is a group having a carbon skeleton including at least one heteroatom Y; O is oxygen; X and X' are elements having a valence of four; n varies from 1 to 10, y varies from 0 to 3, z varies from 0 to 2, and where R, $R^a$, $R^b$, $R^c$ and $R^d$ appear independent from one another in a specific composition.

2. The electrical insulation according to claim 1, wherein —R— has the form —R'—Y'—R"—, where Y' is a group having at least one heteroatom Y; R' and R" are aliphatic groups or aromatic groups which each have from 2 to 40 carbon atoms and valences which are saturated by at least one of hydrogen and functional groups.

3. The electrical insulation according to claim 1, wherein at least one of X and X' is selected from the group consisting of silicon and titanium.

4. The electrical insulation according to claim 2, wherein the at least one heteroatom Y of Y' is selected from the group consisting of sulfur, nitrogen, and oxygen.

5. The electrical insulation according to claim 2, wherein R contains a secondary amino group.

6. The electrical insulation according to claim 2, wherein R'=R" and is a divalent methyl-t-butyl phenoxy group.

7. The electrical insulation according to claim 2, wherein at least one of R' and R" contains at least one functional group selected from the group consisting of a carbonyl group and an hydroxyl group.

8. The electrical insulation according to claim 2, wherein the at least one hydrolyzable alkoxy compound is an alkoxysilane in which R'=R"=$C_3H_6$; $R^a$, $R^b$, $R^c$ and $R^d$ and $R^e$ are $C_mH_{2m+1}$ groups and m<10; X=X'=Si; Y=S, n=1, and y=3.

9. The electrical insulation according to claim 1, wherein —R— has the form

where R* is an aliphatic hydrocarbon group or aromatic hydrocarbon group, and where Y* is a group having at least one heteroatom Y.

10. The electrical insulation according to claim 9, wherein at least one of X and X' is selected from the group consisting of silicon and titanium.

11. The electrical insulation according to claim 9, wherein Y is selected from the group consisting of sulfur and oxygen.

12. The electrical insulation according to claim 9, wherein R contains a secondary amino group.

13. The electrical insulation according to claim 9, wherein Y* is a heteroaromatic group.

14. The electrical insulation according to claim 1, wherein at least one of X and X' is silicon.

15. The electrical insulation according to claim 1, wherein at least one of X and X' is titanium.

16. The electrical insulation according to claim 1, wherein at least one of $R^a$, $R^b$, $R^c$, $R^d$ and $R^e$ is an octyl group.

17. The electrical insulation according to claim 1, wherein the at least one hydrolyzable alkoxy compound is an oligomeric siloxane which is formed from a monomer (n=1) by partial hydrolysis thereof followed by condensation.

18. The electrical insulation according to claim 1, wherein at least one of $R^b$ and $R^d$ have a vinyl group.

19. The electrical insulation according to claim 1, wherein the polyolefin is a polyethylene having a degree of crosslinking ranging from 0 to 100%.

20. The electrical insulation according to claim 1, wherein the polyolefin is selected from the group consisting of crosslinked homopolymers of ethylene, crosslinked copolymers of ethylene, and mixtures thereof.

21. The electrical insulation according to claim 1, further comprising at least one of antioxidents or crosslinking agents, wherein the voltage stabilizer and the at least one of antioxidants or crosslinking agents are introduced into the polyolefin by diffusion.

22. An insulated electrical conductor comprising:
at least one conductor; and
electrical insulation according to claim 1 enclosing the at least one conductor.

* * * * *